United States Patent
Hong

(10) Patent No.: US 7,826,153 B2
(45) Date of Patent: Nov. 2, 2010

(54) LENS ASSEMBLY AND METHOD FOR MANUFACTURING THE SAME

(75) Inventor: Jung Ha Hong, Suwon-si (KR)

(73) Assignee: LG Innotek Co., Ltd., Seoul (KR)

( * ) Notice: Subject to any disclaimer, the term of this patent is extended or adjusted under 35 U.S.C. 154(b) by 168 days.

(21) Appl. No.: 11/944,184

(22) Filed: Nov. 21, 2007

(65) Prior Publication Data

US 2008/0123199 A1 May 29, 2008

(30) Foreign Application Priority Data

Nov. 24, 2006 (KR) .................. 10-2006-0116814

(51) Int. Cl.
*G02B 9/00* (2006.01)
(52) U.S. Cl. ........................... 359/797; 359/796
(58) Field of Classification Search .............. 359/796, 359/797
See application file for complete search history.

(56) References Cited

U.S. PATENT DOCUMENTS 3,706,486 A * 12/1972 de Montebello ............ 359/619
6,473,238 B1 * 10/2002 Daniell ....................... 359/622
7,463,401 B2 * 12/2008 Feldman et al. ............. 359/280

* cited by examiner

*Primary Examiner*—William C Choi
(74) *Attorney, Agent, or Firm*—Saliwanchik, Lloyd & Saliwanchik

(57) ABSTRACT

Disclosed are a lens assembly and a method for manufacturing the same. The method includes delineating and processing a surface of a lens substrate to form a plurality of lens units; bonding a plurality of such lens substrates having different properties to each other as one integrated body; and dicing the integrated body into a lens unit, thereby producing a plurality of lens assemblies.

11 Claims, 3 Drawing Sheets

LENS ASSEMBLY AND METHOD FOR MANUFACTURING THE SAME

CROSS-REFERENCE TO RELATED APPLICATION

The present application claims the benefit under 35 U.S.C. §119 of Korean Patent Application No. 10-2006-0116814, filed Nov. 24, 2006, which is hereby incorporated by reference in its entirety.

BACKGROUND

Recently, a mobile appliance such as a portable phone equipped with a camera has been introduced, so that a still image and/or a moving picture can be taken regardless of time and locations.

Further, in order to obtain a photograph having high resolution and high definition, the performance of a camera has been gradually improved, and a camera module equipped with an automatic focus adjusting function, a close-up photographing function, and an optical zoom function has been mounted on the mobile appliance.

Currently, in order to ensure the performance of a camera module mounted on the mobile appliance, the size of the camera module has to be enlarged.

However, when taking the design of the mobile appliance into consideration, if the size of the camera module is enlarged, it is difficult to mount the camera module on the mobile appliance, and the performance of the mobile appliance is limited.

BRIEF SUMMARY

Accordingly, embodiments of the present invention address the above-mentioned problems occurring in the prior art. Implementations of the present invention provide a small-size lens assembly that can be mass-produced and a method for manufacturing the same.

According to one embodiment of the present invention, there is provided a method for manufacturing a lens assembly, including: delineating and processing a surface of a lens substrate to form a plurality of lens units; bonding a plurality of such lens substrates having different properties to each other as one integrated body, and dicing the integrated body into a lens unit, thereby producing a plurality of lens assemblies.

According to another embodiment of the present invention, there is provided a lens assembly including a plurality of lenses formed by stacking and bonding a plurality of lens wafers, each lens wafer including a plurality of lens units, and dicing the stacked and bonded plurality of lens wafers, wherein the plurality of lenses each include curvature parts and peripheral parts, where the peripheral parts of the plurality of lenses are coupled to each other.

According to yet another embodiment, there is provided a lens assembly including a first lens comprising a first curvature part having a first curvature and a first peripheral part formed in a vicinity of the first curvature part; and a second lens comprising a second curvature part having a second curvature and a second peripheral part formed in a vicinity of the second curvature part, wherein the first peripheral part is coupled to the second peripheral part, and side surfaces of the coupled first and second lenses are along a same vertical plane.

DETAILED DESCRIPTION

Hereinafter, embodiments of the present invention will be described with reference to the accompanying drawings.

Figure 1:
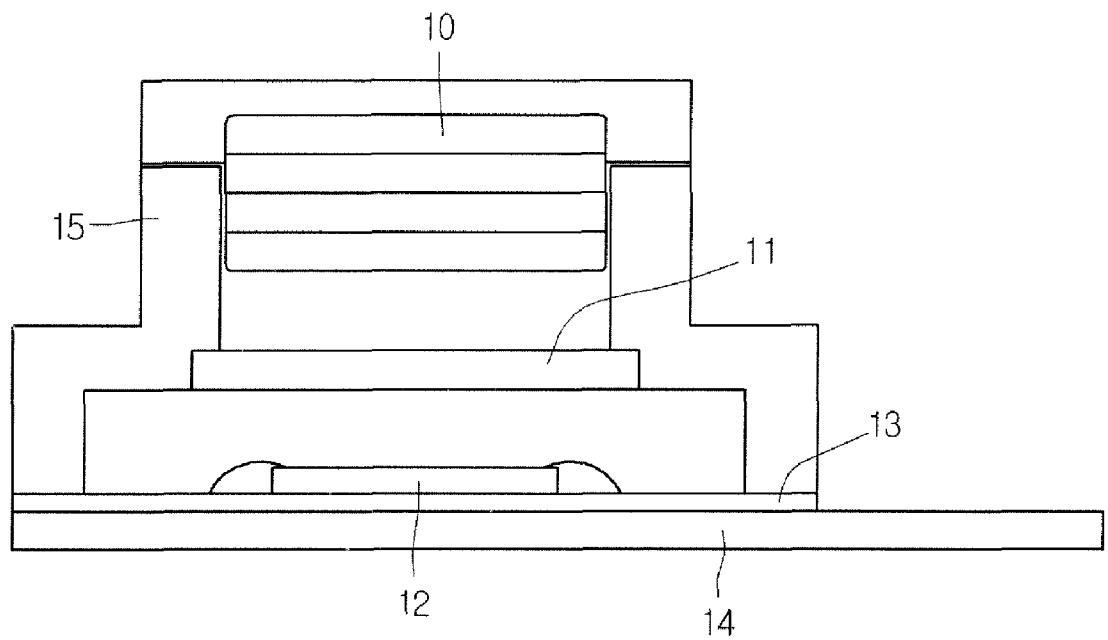
FIG. 1 is a cross-sectional view showing a camera module.

Referring to FIG. 1, a camera module according to an embodiment of the present invention includes a lens assembly 10 having a plurality of lenses, a color filter 11 that can block ultraviolet rays, an image sensor 12 for sensing an image, a printed circuit board (PCB) 13 that is provided with a circuit pattern, a flexible PCB 14 that is connected with a connector, and a housing 15 that supports the lens assembly 10 and the color filter 11.

Figure 2:
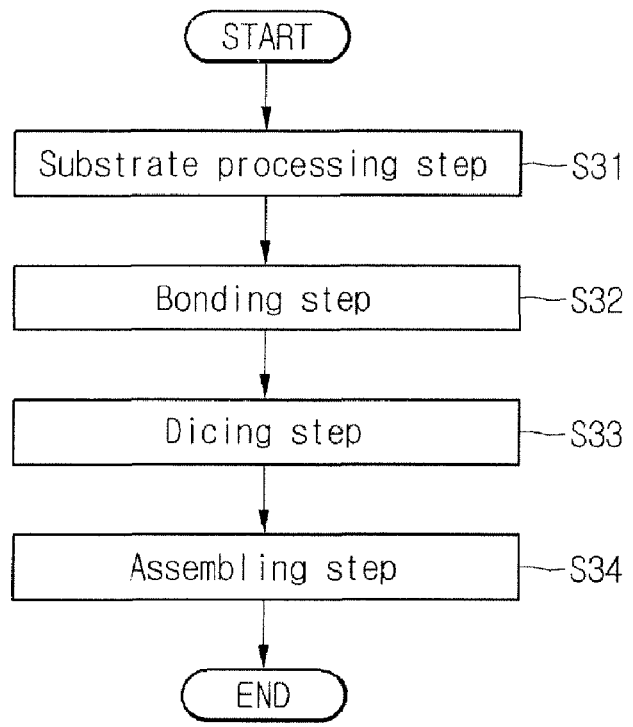
FIG. 2 is a flowchart showing the steps of manufacturing a lens assembly according to an embodiment of the present invention.

FIG. 2 is a flowchart showing the steps of manufacturing the lens assembly 10 according to an embodiment of the present invention.

A lens assembly may be processed or molded by using glass or plastic.

However, when manufacturing the lens assembly 10 according to embodiments of the present invention, a lens substrate prepared in the form of an optical device for a lens is processed and then diced, such that a large amount of lens assemblies can be produced from a single lens substrate.

To this end, as illustrated in FIG. 2, a method for manufacturing the lens assembly 10 according to embodiments of the present invention includes a substrate processing step (S31), a bonding step (S32), a dicing step (S33), and an assembling step (S34).

In the substrate processing step (S31), each lens substrate and each color filter substrate are processed in such a manner that lenses can be formed in a plurality of lens units, delineating the surface of each of the lens substrates into several parts.

A lens substrate can include borosilicate-based glass or crown-based glass. The lens substrate is an optical lens substrate. The optical lens substrate allows an aspherical lens, which has various curvatures in order to focus or disperse light, to be formed on the surface of the lens substrate.

The surface of the lens substrate can be delineated into a plurality of lens units, and each lens unit is processed to have a predetermined curvature.

Accordingly, a plurality of lenses having the same first curvature may be formed in the lens units formed on the surface of the lens substrate.

Figure 3A:
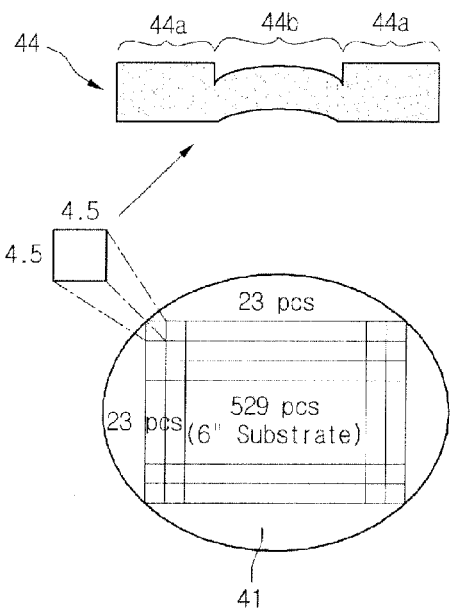
FIGS. 3A to 3D are views showing a lens substrate and a color filter substrate according to an embodiment of the present invention.

Referring to FIG. 3A, a primary lens substrate 41 can be delineated with lens units including primary lenses 44, each primary lenses having the same curvatures.

Figure 3B:
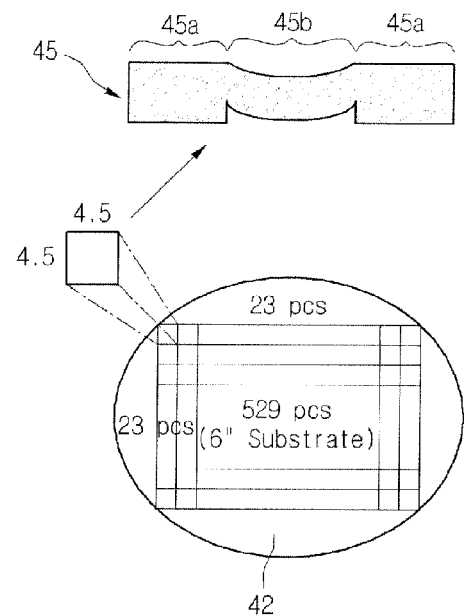

Referring to FIG. 3B, a secondary lens substrate 42 can be delineated with secondary lenses 45.

The lens units of the secondary lenses 45 have a second curvature, which is different from that of the primary lenses 44.

A primary lens 44 according to an embodiment of the present invention includes a first curvature part 44*b* having the first curvature and first peripheral parts 44*a* having substantially no curvature in the vicinity of the first curvature pall 44*b*.

The secondary lens 45 includes a second curvature part 45*b* having a second curvature and second peripheral pails 45*a* having substantially no curvature in the vicinity of the second curvature part 45*b*.

Therefore, the first peripheral part 44*a* is provided in the vicinity of the first curvature part 44*b*, and the second peripheral part 45*a* is provided in the vicinity of the second curvature part 45*b*.

According to one embodiment, as shown in FIGS. 3A to 3D, a 6-inch primary lens substrate 41 has 529 (23×23) lens units, and the primary lenses 44 having the first curvature are formed in each of the delineated lens units.

Accordingly, 529 primary lenses 44 can be formed on the 6-inch primary lens substrate 41.

Similarly, a 6-inch second lens substrate 42 can have 529 lens units, and the secondary lenses 45 having the second curvature are formed in each of the delineated lens units.

Accordingly, 529 secondary lenses 45 can be formed on the 6-inch secondary lens substrate 42.

Although the lens units are described in this embodiment as being formed on a 6-inch substrate, embodiments are not limited thereto. For example, an 8-inch or larger diameter substrate can be used.

Figure 3C:
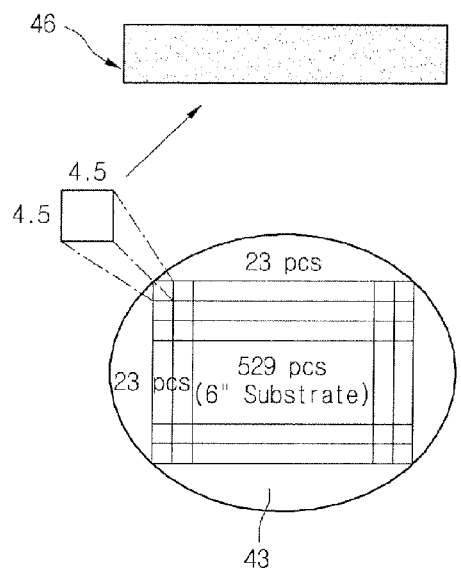

In addition, as shown in FIG. 3C, 529 color filters 46 can be formed on a 6-inch color filter substrate 43.

An aspherical surface having various curvatures is formed between the primary and secondary lens substrates 41 and 42. That is, the curvature of the primary lens 44 formed in each lens unit on the primary lens substrate 41 is different from the curvature of the secondary lens 45 formed in each lens unit on the second lens substrate 42.

For reference, the lens is a kind of a glass lens used for a camera module of a portable phone, a digital camera, and an optical storage unit, and can provide an image having quality superior to that of a plastic lens.

In order to form the first and second curvature parts 44*b* and 45*b* of the primary and secondary lens substrates 41 and 42, the curvature of each lens unit may be directly formed by using a laser beam.

In other words, the surface of the lens substrate can be processed by using a laser beam, so that a predetermined curvature may be formed with respect to each lens unit.

The laser beam can be employed when a spherical curvature such as a convex/concave curvature is formed.

In addition, according to another embodiment of forming the curvature of the primary and secondary lens substrates 41 and 42, a predetermined curvature may be formed with respect to each lens unit through a lithography process.

In other words, similarly to a conventional semiconductor lithography process, after coating photoresist on a lens substrate, an exposure and development process can be performed according to a mask pattern, thereby forming a curvature according to the mask pattern.

Accordingly, the formation of the curvature of the lens substrates through a lithography process may be employed when forming an aspherical lens.

Meanwhile, in addition to processing the lens substrates, lens units on a color filter substrate 43 are processed, thereby forming color filters 46 in each of the delineated lens units.

Figure 3D:
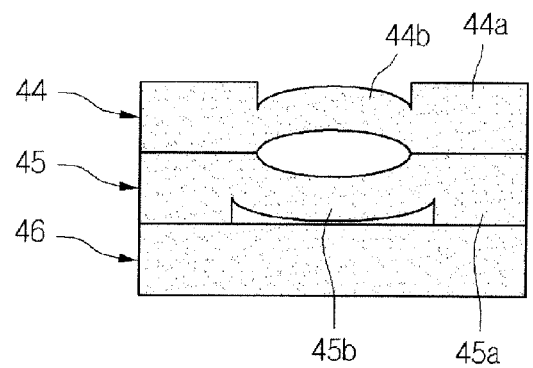

FIG. 3D shows the integration of the color filters 46 and the primary and secondary lenses 44 and 45.

According to embodiments of the present invention, when the primary lens substrate 41, the secondary lens substrate 42, and the color filter substrate 43 are aligned, the first peripheral part 44*a* of the primary lens 44 can be bonded to the second peripheral part 45*a* of the secondary lens 45, which can be bonded to the color filter 46.

After the primary and secondary lens substrates 41 and 42 and the color filter substrate 43 have been processed as described with respect to the substrate processing step (S31), the bonding step is performed to integrally bond the substrates to each other as one body (S32).

Figure 4:
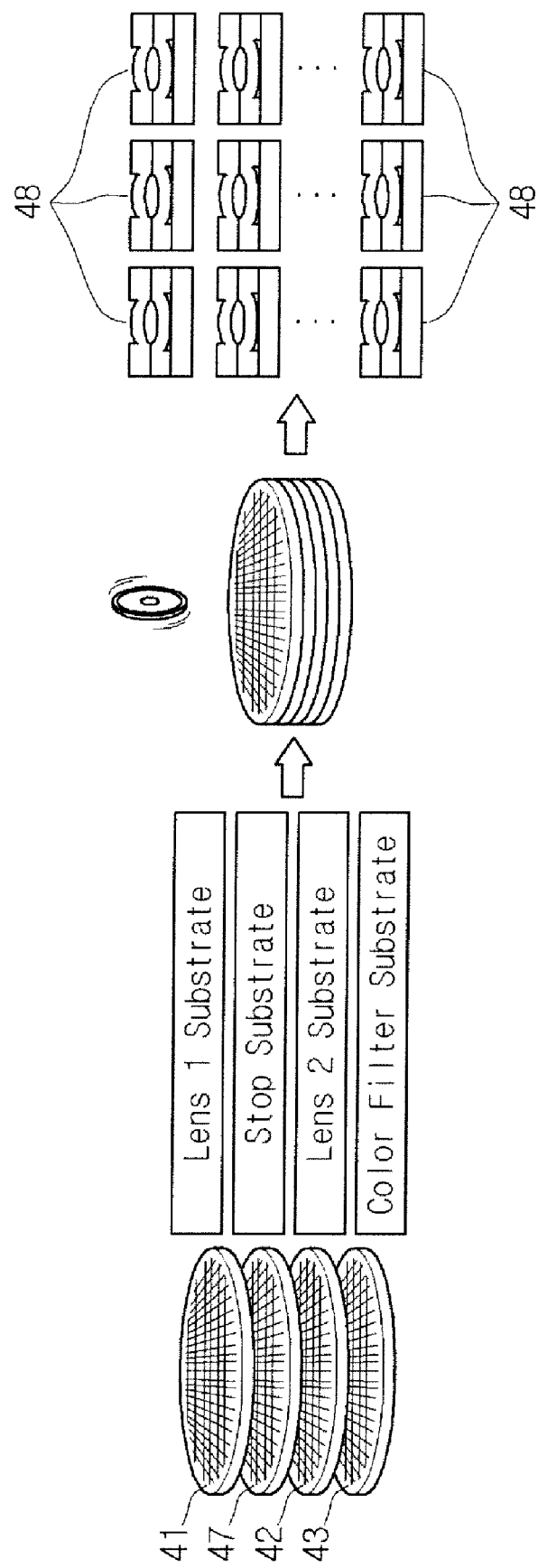
FIG. 4 is a view showing bonding and dicing steps according to an embodiment of the present invention.

Referring to FIG. 4, which shows the bonding step (S32) and the dicing step (S33), the color filter substrate 43, the secondary lens substrate 42, and the primary lens substrate 41 that have been processed in the processing step are sequentially stacked on each other and then bonded to each other.

In the bonding step, inert gas can be injected and pumped down, and the bonded primary and secondary lens substrates 41 and 42 and color filter substrate 43 are heated at a final polymer curing temperature.

Then, the bonded substrates are compressed for the polymer curing time.

In a further embodiment, a stop substrate 47, which can be formed with a silicon material, can be interposed between the primary lens substrate 41 and the secondary lens substrate 42 during the bonding step.

The stop substrate 47 is a spacer that can be used to fix the primary lens substrate 41 to the secondary lens substrate 42 and adjust an amount of light to block useless light.

The stop substrate 47 can adjust the interval between the lens substrates according to the thickness of the stop substrate 47.

Although the stop substrate 47 is described in this embodiment as being interposed between the primary lens substrate 41 and the secondary lens substrate 42, embodiments are not limited thereto. For example, the stop substrate 47 may make contact with the front surface of the primary lens substrate 41 or the rear surface of the secondary lens substrate 42.

In addition, although it is not shown in drawings, the stop substrate 47 may be provided with holes passing through the stop substrate 47.

The holes passing through the stop substrate 47 can be used to adjust an amount of incident light. Therefore, the size of the holes can be determined by the number of lenses and a focal distance.

After the bonding step (S32) has been performed, the dicing step (S33) is performed to dice the bonded substrates so that the bonded substrates are divided into lens assemblies 48 corresponding to the number of lens units.

The dicing step (S33) can be accomplished by using a blade in order to separate the lens units formed on the substrate from each other. In example embodiments, a 2" blade or a 4" blade is used according to the hardness of the substrate.

The blade may be selected according to the hardness, the softness, the wear resistance, or a device characteristic. In certain embodiments, the blade can be a resin blade or a nickel blade.

As shown in FIG. 3D, the diced lens assembly has a structure in which the first peripheral part 44*a* of the primary lens 44, the second peripheral part 45*a* of the secondary lens 45, and the color filter 46 are integrally bonded to each other.

Since the primary lens substrate 41 and the secondary lens substrate 42 are bonded to each other and then diced during the same step at the same time, the side surfaces of the primary and secondary lenses 44 and 45 can be arranged on the same vertical plane.

In further embodiments, tertiary and quartic lens substrates can be added to the primary and secondary lens substrates of the lens assembly.

If the tertiary and quartic lens substrates are added to the lens assembly, the side surfaces of the tertiary and quartic lens generated from the tertiary and quartic lens substrates can be arranged in the same vertical plane as the primary and secondary lens substrates by bonding the four substrates to each other and then dicing them during the same step.

After the processing step (S31), the bonding step (S32), and the dicing step (S33) have been performed, the lens assemblies 48 can be coupled to housings 15 of camera modules and then assembled, thereby completing a lens module working process for camera modules corresponding to the number of lens units.

In a camera module assembly, an image sensor 12 is coupled to the housing 15 of the camera module.

The image sensor 12 can be coupled to the housing 15 in a package type such as a chip scale package (CSP) in order to improve an image sensing capability of the camera module and realize a small-sized camera module.

Since a CSP manufacturing technology employing a flip chip technology or a ball grid array (BGA) technology does not use a lead frame, an ultra-small sized package having a size substantially identical to a chip size can be manufactured.

When assembling a camera module in the package type as described above, the image sensor 12 is protected from impurities, so that the image sensor 12 is prevented from being contaminated.

Since the lens assembly 48 is formed in a substrate unit, a reflow process can be performed to mount the lens assembly 48 on a camera module.

In certain embodiments, even the image sensor 12 can be mounted on the camera module through the reflow process.

Meanwhile, although the color filter substrate 43, the secondary lens substrate 42, and the primary lens substrate 41 are sequentially stacked on each other and bonded to each other in the bonding step (S32), this is illustrative purpose only. According to another embodiment, the secondary substrate 42 and the primary lens substrate 41 can be bonded to each other without using the color filter substrate 43.

In other words, the color filter 46 can be previously (or initially) mounted on the housing 15 of the camera module. Then, a lens assembly, which is obtained by bonding the primary and secondary lens substrates 41 and 42 to each other, can be mounted on the housing 15 equipped with the color filter 46.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A lens assembly, comprising:
a plurality of lenses formed by stacking and bonding a plurality of lens wafers, each lens wafer including a plurality of lens units, and then dicing the stacked and bonded plurality of lens wafers according to lens unit, wherein each of the lenses of the plurality of lenses includes curvature parts and peripheral parts, wherein the peripheral parts of the plurality of lenses are coupled to each other, wherein the curvature parts of the plurality of lenses have different curvatures according to the lenses; and
a stop substrate interposed between lenses of the plurality of lenses in order to adjust an amount of light, wherein the stop substrate is provided with a hole passing through the stop substrate.

2. The lens assembly according to claim 1, wherein the stop substrate comprises a silicon material.

3. The lens assembly according to claim 1, further comprising a color filter bonded to one end portion of the lenses of the plurality of lenses.

4. The lens assembly according to claim 1, wherein the lenses of the plurality of lenses comprise glass.

5. The lens assembly according to claim 1, wherein the peripheral parts include a primary peripheral part from a first lens of the plurality of lenses and a secondary peripheral part from a second lens of the plurality of lenses, wherein the primary peripheral part and the secondary peripheral part are bonded to each other.

6. A lens assembly comprising:
a first lens including a first curvature part having a first curvature and a first peripheral part formed in a vicinity of the first curvature part;
a second lens including a second curvature part having a second curvature and a second peripheral part formed in a vicinity of the second curvature part;
a third lens including a third curvature part having a third curvature and a third peripheral part formed in a vicinity of the third curvature part;
a fourth lens including a fourth curvature part having a fourth curvature and a fourth peripheral part formed in a vicinity of the fourth curvature part; and
a stop substrate which fixes the lenses to each other, and is interposed between the lenses or bonded to an upper end of the first lens in order to adjust an amount of light,
wherein the first peripheral part is coupled to the second peripheral part, and side surfaces of the coupled first and second lenses are along a same vertical plane,
wherein the second peripheral part is coupled to the third peripheral part, and side surfaces of the coupled first, second, and third lenses are arranged in the same vertical plane,
wherein the third peripheral part is coupled to the fourth peripheral part, and side surfaces of the coupled first, second, third, and fourth lenses are arranged in the same vertical plane.

7. The lens assembly as claimed in claim 6, wherein the stop substrate includes a silicon material, and is provided with a hole passing through the stop substrate in order to adjust an amount of light.

8. The lens assembly as claimed in claim 6, further comprising a color filter bonded to one end portion of the bonded lenses.

9. The lens assembly as claimed in claim 6, wherein the first, second, third, and fourth lenses include glass.

10. The lens assembly as claimed in claim 6, wherein the curvature parts have different curvatures according to the first, second, third, and fourth lenses.

11. The lens assembly as claimed in claim 6, wherein the peripheral parts include first, second, third and fourth peripheral parts which are bonded to each other.

* * * * *